(12) United States Patent
Kohlbock

(10) Patent No.: US 9,555,808 B2
(45) Date of Patent: Jan. 31, 2017

(54) METHOD FOR OPERATING A POWERTRAIN

(71) Applicant: Magna Powertrain AG & Co KG, Lannach (AT)

(72) Inventor: Markus Kohlbock, Ottnang a.H. (AT)

(73) Assignee: MAGNA POWERTRAIN AG & CO KG, Lannach (AT)

( * ) Notice: Subject to any disclaimer, the term of this patent is extended or adjusted under 35 U.S.C. 154(b) by 0 days.

(21) Appl. No.: 14/414,615

(22) PCT Filed: Jul. 30, 2013

(86) PCT No.: PCT/EP2013/066007
§ 371 (c)(1),
(2) Date: Jan. 13, 2015

(87) PCT Pub. No.: WO2014/020026
PCT Pub. Date: Feb. 6, 2014

(65) Prior Publication Data
US 2015/0175164 A1 Jun. 25, 2015

(30) Foreign Application Priority Data

Aug. 2, 2012 (DE) .......................... 10 2012 213 647

(51) Int. Cl.
*H02P 1/00* (2006.01)
*B60W 30/184* (2012.01)
(Continued)

(52) U.S. Cl.
CPC .......... *B60W 30/1846* (2013.01); *B60W 10/08* (2013.01); *B60W 10/16* (2013.01);
(Continued)

(58) Field of Classification Search
CPC .. B60W 30/1846; B60W 10/16; B60W 10/08; B60W 2710/081; B60W 2520/28; B60W 20/00; B60W 2520/10; B60W 2510/0241; F16H 48/34; F16H 2048/343; F16H 2048/204; Y10T 477/347; B60K 17/165; B60K 23/04

See application file for complete search history.

(56) References Cited

U.S. PATENT DOCUMENTS

| | | | | |
|---|---|---|---|---|
| 5,279,401 A | * | 1/1994 | Stall | .............. F16H 48/08 192/52.4 |
| 2002/0055411 A1 | * | 5/2002 | Yoshiaki | .............. B60K 6/48 477/107 |

(Continued)

FOREIGN PATENT DOCUMENTS

| | | |
|---|---|---|
| CN | 1263013 A | 8/2000 |
| CN | 1757553 A | 4/2006 |

(Continued)

OTHER PUBLICATIONS

International Search Report dated Oct. 16, 2013.
Search Report dated Jun. 1, 2016 from corresponding Chinese Patent Application No. 201380041132.2.

*Primary Examiner* — David J Hlavka
(74) *Attorney, Agent, or Firm* — Dickinson Wright PLLC

(57) ABSTRACT

A method for operating a powertrain of a motor vehicle with two vehicle axles which can be driven by separate drive assemblies, wherein at least one of the two vehicle axles can be driven by an electromotive drive assembly, and wherein the at least one vehicle axle has two wheels and at least three axle portions, wherein a first axle portion has a first wheel, wherein the first and a second axle portion are coupled by a differential gear, wherein the second and a third axle portion are arranged so they can be connected together by a clutch, and wherein the third axle portion has a second wheel. During drive mode of the motor vehicle with the clutch open, the electromotive drive assembly is held at a standby (Continued)

rotation speed under active regulation by an electric drive control unit, wherein the standby rotation speed tracks a synchronization rotation speed.

10 Claims, 4 Drawing Sheets

(51) Int. Cl.
    *B60W 10/08* (2006.01)
    *B60W 10/16* (2012.01)
    *F16H 48/34* (2012.01)
    *B60K 17/16* (2006.01)
    *B60K 23/04* (2006.01)
    *B60W 20/00* (2016.01)
    *F16H 48/20* (2012.01)

(52) U.S. Cl.
    CPC ............ *F16H 48/34* (2013.01); *B60K 17/165* (2013.01); *B60K 23/04* (2013.01); *B60W 20/00* (2013.01); *B60W 2510/0241* (2013.01); *B60W 2520/10* (2013.01); *B60W 2520/28* (2013.01); *B60W 2710/081* (2013.01); *F16H 2048/204* (2013.01); *F16H 2048/343* (2013.01); *Y10T 477/347* (2015.01)

(56) References Cited

U.S. PATENT DOCUMENTS

| | | | | |
|---|---|---|---|---|
| 2003/0216215 | A1* | 11/2003 | Suzuki | B60K 6/46 477/5 |
| 2004/0040759 | A1* | 3/2004 | Shimizu | B60K 6/44 180/65.225 |
| 2005/0282682 | A1* | 12/2005 | Ishii | B60W 10/06 477/107 |
| 2012/0252630 | A1* | 10/2012 | Sasaki | B60W 10/08 477/80 |
| 2012/0259494 | A1* | 10/2012 | Schaeffer | B60K 6/387 701/22 |
| 2013/0116087 | A1* | 5/2013 | Ichikawa | B60K 5/08 477/79 |
| 2013/0203543 | A1* | 8/2013 | Sten | F16H 48/36 475/150 |
| 2014/0088833 | A1* | 3/2014 | Matsuno | B60W 30/045 701/41 |
| 2014/0326430 | A1 | 11/2014 | Carpenter et al. | |

FOREIGN PATENT DOCUMENTS

| | | |
|---|---|---|
| CN | 102582411 A | 7/2012 |
| DE | 10 2009 055 249 A1 | 6/2011 |
| WO | WO2011080436 A1 | 7/2011 |

\* cited by examiner

METHOD FOR OPERATING A POWERTRAIN

CROSS-REFERENCE TO RELATED APPLICATIONS

The invention is based on DE102012213647.9, filed on Aug. 2, 2012 at the German Patent Office and is a national phase of the international application PCT/EP2013/066007, filed on Jul. 30, 2013, which are all hereby incorporated by reference.

TECHNICAL FIELD

The present invention concerns a method for operating a powertrain of a motor vehicle with two vehicle axles which can be driven by separate drive assemblies.

BACKGROUND

To improve driving dynamics in motor vehicles, powertrains are used which can be adapted to the driving conditions applicable at the time. For example in hybrid vehicles, in certain driving situations it may be advantageous to separate an electric motor of the hybrid drive from the other components of the powertrain, such as when the internal combustion engine of the hybrid drive is supplying the required drive torque and the drive power of the electric motor is not required.

Here clutches are used which serve to selectively couple together the components of the powertrain or separate these from each other. A clutch may also ensure a safety shut-off in the event of operating faults.

In the case of a hybrid vehicle, the vehicle may be kept in motion by an internal combustion engine, wherein the drive movement of the vehicle axle driven by the internal combustion engine is transmitted to the wheels of the second vehicle axle via a gear mechanism, which is also rotating in this situation. Due to losses and friction which occur throughout the entire arrangement of the powertrain, an electromotive drive assembly is also accelerated and hence dragged passively. This behavior normally contributes substantially to shortening the synchronization time of a clutch.

Such a powertrain is known from DE 10 2000 055 249 A1. This discloses both a device and a method for operating a claw clutch in a motor vehicle with an electromotive drive, wherein the two clutch parts of the claw clutch transmit a force between the electromotive drive and an axle supporting the wheels of the motor vehicle, and before closure of the claw clutch are set to a predefined rotation speed difference between the axle and the electromotive drive, wherein the predefined rotation speed difference is formed from a synchronization rotation speed of the electromotive drive and a rotation speed of the motor vehicle wheels.

The term "predefined rotation speed difference" here refers to the last phase of a previously initiated clutch engagement process. The clutch element which is connected to the vehicle axle has a rotation speed which is higher or lower by a differential rotation speed than the synchronization rotation speed, which ensures that the two clutch elements of the claw clutch can intermesh in that a tooth of one clutch element engages in a gap of the other clutch element.

The device also disclosed in DE 10 2009 055 249 A1 is characterized in that means are present which accelerate the passive electromotive drive during drive operation of the motor vehicle with the claw clutch open. Advantageously, the electromotive drive is operated in an idling operating mode and is accelerated by a drag moment of a gear mechanism, wherein the gear mechanism is moved via the axle carrying the wheels of the moving motor vehicle. The drag moment is amplified if the electromotive drive and the claw clutch are arranged in the transmission oil of the attached gear mechanism.

Because of the spatial conditions in certain vehicles and to improve the kinematics, a substantially different arrangement of the components of the powertrain from that given in DE 10 2009 055 249 A1 may be advantageous.

In particular, a coaxial arrangement of a differential gear, an electromotive drive assembly and a clutch on a vehicle axle allows a particularly compact, lightweight and space-saving configuration of a powertrain for a motor vehicle.

It is therefore the object of the invention to improve a method for operating a powertrain in relation to the known embodiments.

SUMMARY

This object is achieved by a method for operating a powertrain of a motor vehicle with two vehicle axles which can be driven by separate drive assemblies, wherein at least one of the two vehicle axles can be driven by an electromotive drive assembly, and wherein the at least one vehicle axle has two wheels and at least three axleshaft portions wherein a first axleshaft portion has a first wheel, wherein the first axleshaft portion and a second axleshaft portion are coupled by a differential gear, wherein the second axleshaft portion and a third axleshaft portion are arranged so they can be connected together by a clutch, and wherein the third axleshaft portion has a second wheel, characterized in that during drive mode of the motor vehicle with the clutch open, the electromotive drive assembly is held at a standby rotation speed under active regulation by an electric drive control unit, wherein the standby rotation speed tracks a synchronization rotation speed.

The method in accordance with the invention takes into account modified conditions and properties, and constitutes a reliable and highly dynamic method for operating a powertrain wherein an electromotive drive assembly can be engaged selectively and rapidly by a clutch. At the same time, the energy consumption is kept as low as possible, the wear on the components is minimized and hence their useful service life is maximized.

In accordance with the invention, the method allows the reliable and highly dynamic operation of a powertrain of a motor vehicle with two vehicle axles which can be driven by separate drive assemblies. At least one of the two vehicle axles may be driven by an electromotive drive assembly and the at least one vehicle axle has two wheels and at least three axleshaft portions, wherein a first axleshaft portion has a first wheel, wherein the first axleshaft portion and a second axleshaft portion are coupled by a differential gear, wherein the second axleshaft portion and a third axleshaft portion are arranged so they can be connected together by a clutch, and wherein the third axleshaft portion has a second wheel. Advantageously, a planet wheel of the differential gear is drivably connected to the electromotive drive assembly.

In one embodiment, the clutch has a first clutch part which is assigned to the second axleshaft portion, and a second clutch part which is assigned to the third axleshaft portion, wherein one of the two clutch parts may be actuated by an actuator.

This arrangement of a powertrain, known in itself, saves space on installation in the vehicle, and saves weight and cost in design. However the drag moments accelerating the electromotive drive assembly in this otherwise very advantageous arrangement are not sufficiently effective for a powertrain.

By dividing the vehicle axle into a second axleshaft portion and a third axleshaft portion, when the clutch is open and the electromotive drive assembly is stationary, an operating state occurs in which the first and second axleshaft portions are set in a rapid contra-rotating movement corresponding to the wheel rotation speed. This rotational movement subjects the components of the differential gear to a high wear load.

During drive operation of the motor vehicle with the clutch open, the electromotive drive assembly is held at a standby rotation speed under active regulation by an electric drive control unit, wherein the standby rotation speed tracks the synchronization speed; therefore above all the relative rotational movement of the components of the differential gear is reduced and hence overheating and wear are avoided.

The synchronization rotation speed is the speed of the electromotive drive assembly at which the two clutch parts, arranged between the second and third axleshaft portions of the vehicle axle, have precisely the same rotation speed.

The standby rotation speed is a rotation speed of the electromotive drive assembly, wherein the value of the standby rotation speed lies between zero and the synchronization rotation speed, tracking this accordingly. The rotation direction is oriented such that as the standby rotation speed increases, the relative rotational movement of the two clutch parts is reduced.

Refinements of the invention are described in the dependent claims, the description and the enclosed drawings.

In accordance with a preferred embodiment of the invention, the clutch is a claw clutch.

In accordance with a further preferred embodiment of the invention, the standby rotation speed of the electromotive drive assembly is at least half as great as the synchronization speed. With a symmetrical structure of the differential gear, at a standby rotation speed of 50% of the synchronization speed, an operating state occurs in which the second axleshaft portion is substantially stationary and friction losses and splash losses in this part of the powertrain are very low.

The method is particularly advantageous if the standby rotation speed of the electromotive drive assembly is established by the vehicle speed of the motor vehicle and/or the rotation speed of the wheels. The vehicle speed may be determined from the measured rotation speed of the wheels. Because of the translation ratios in the powertrain, the speed of the second wheel has a clear correlation with the synchronization rotation speed. Thus a suitable value for the standby rotation speed, adapted to the drive speed, may be determined from the wheel rotation speeds.

It is also particularly advantageous if parameters dependent on the vehicle speed are determined from a reference table characterizing in the powertrain of the motor vehicle. Such parameters dependent on vehicle speed are for example the delay times for various shift processes, the closing time of the clutch, or the acceleration behavior of the electromotive drive assembly.

The standby rotation speed of the electromotive drive assembly may advantageously be determined from the current vehicle speed and the powertrain parameters dependent on the vehicle speed.

It is particularly advantageous if the standby rotation speed of the electromotive drive assembly is determined by a predefined nominal value, dependent on the vehicle speed, for a time delay between a signal for engaging the clutch and the end of the clutch engagement process. Thus the standby rotation speed may always be adapted to the vehicle speed and the powertrain parameters dependent on the vehicle speed, so that firstly the nominal value for a time delay between a signal for engaging the clutch and the end of the engagement process is not exceeded, and secondly the standby rotation speed has the smallest possible value. In this way the energy consumption may be kept as low as possible, the wear on the components minimized and hence their useful life maximized.

The standby rotation speed of the electromotive drive assembly is calculated in real time and continuously updated.

Further embodiments of the invention are given in the description, the claims and the drawings.

DRAWINGS

The invention is now explained as an example below with reference to the drawings.

DESCRIPTION

Figure 1:
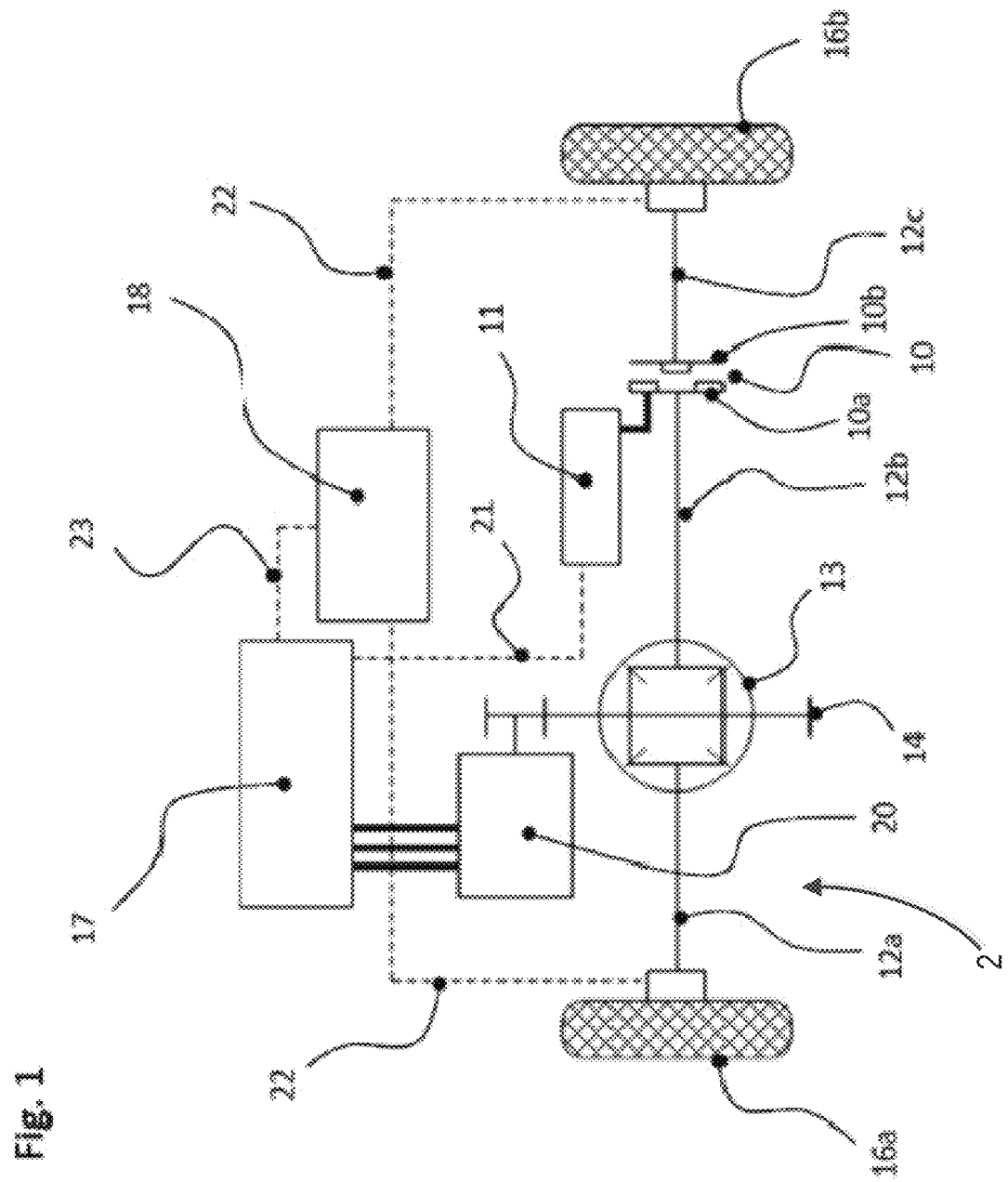
FIG. 1 is a diagrammatic depiction of a powertrain in accordance with the invention.
Figure 4:
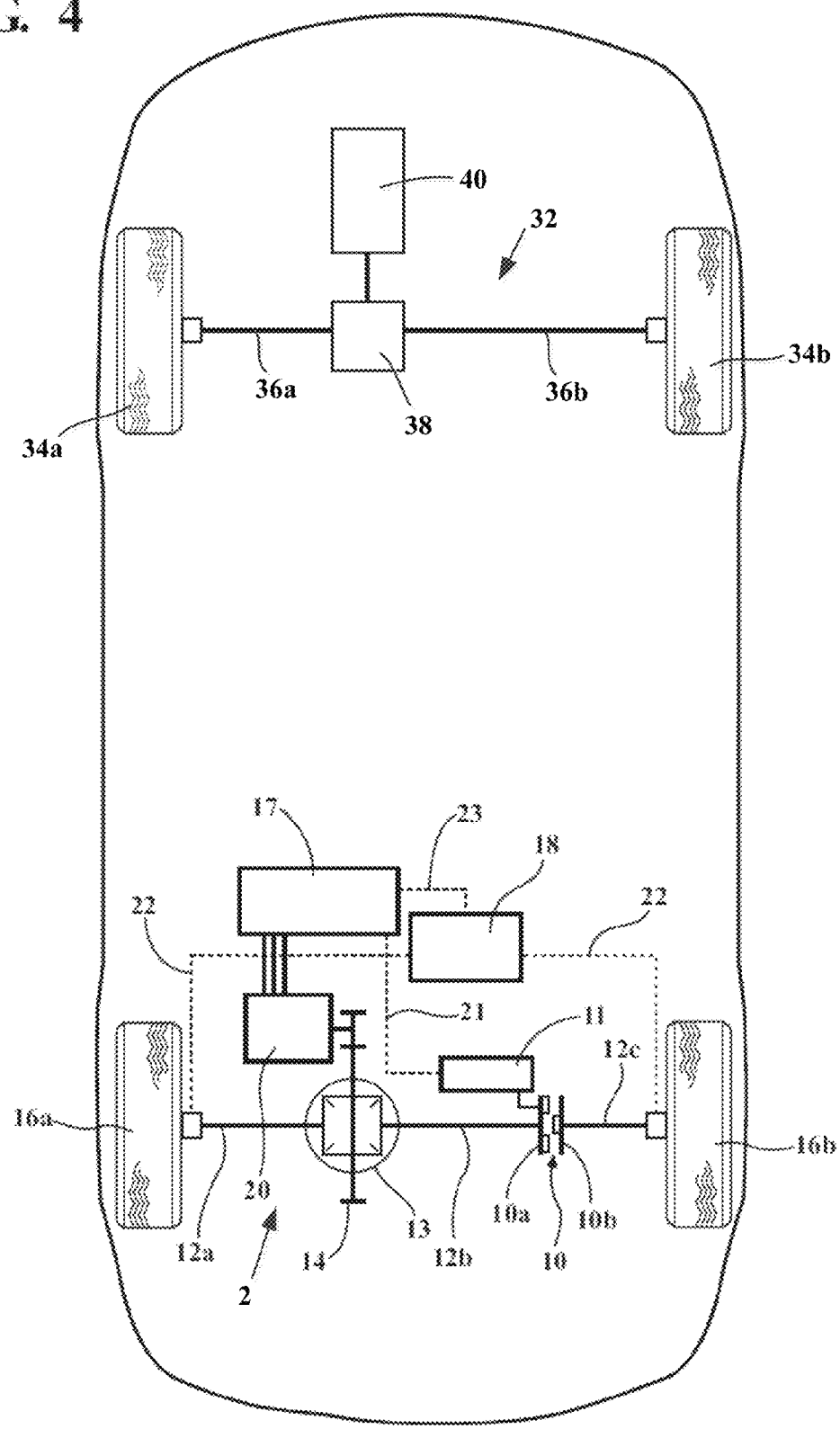
FIG. 4 is a diagrammatic depiction of a powertrain in accordance with the invention illustrating two vehicle axles which can be driven by separate drive assemblies.

FIGS. 1 and 4 illustrate diagrammatically an embodiment of a powertrain which is particularly suitable for performance of the method in accordance with the invention.

A first vehicle axle 2 has a first wheel 16a on a first axleshaft portion 12a. The first axleshaft portion 12a and a second axleshaft portion 12b are coupled by a differential gear 13. A planet wheel 14 of the differential gear 13 is drivably connected to an electromotive drive assembly 20. The electromotive drive assembly 20 is controlled by an electric drive control unit 17 and supplied with power.

The second axleshaft portion 12b is arranged so it can be connected to a third axleshaft portion 12c by a claw clutch 10. The second axleshaft portion 12b has a first clutch part 10a. The third axleshaft portion 12c at one end has a second clutch part 10b and at the other end a second wheel 16b. The clutch part 10a is connected actuatably to a clutch actuator 11, and the clutch actuator 11 is connected via a control line 21 to the electric drive control unit 17. A vehicle control unit 18 is connected firstly via signal lines 22 to wheels 16a, 16b; secondly it is connected via a communication line 23 to the electric drive control unit 17. FIG. 4 illustrates a second vehicle axle 32 having a first wheel 34a on a first axleshaft portion 36a, a second wheel 348 on a second axleshaft portion 36b, and a differential gear 38 drivingly connected to the opposite ends of first axleshaft portion 369 and second axleshaft portion 36b. A second drive assembly 40, such as an internal combustion engine, is driveably connected to differential gear 38.

Figure 2:
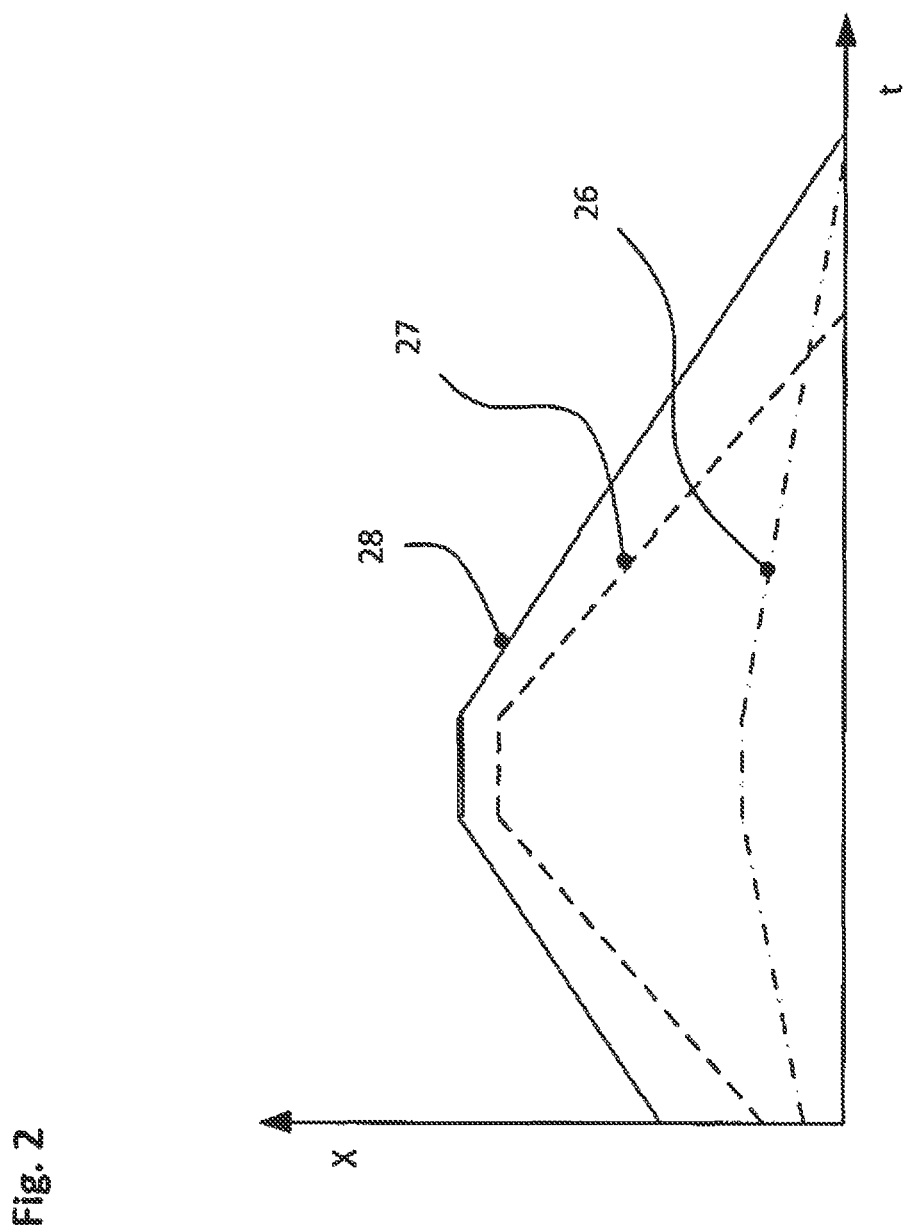
FIG. 2 illustrates diagrammatically an exemplary rotation speed curve of the electromotive drive assembly.

The depictions in FIG. 2 illustrate diagrammatically different rotation speed curves. The rotation speed values X are shown against time t.

The curve of a synchronization rotation speed simultaneously reflects the curve of the vehicle speed over time t. The curve of the standby rotation speed 27, always lying below the curve of the synchronization speed 28, is determined by the rules and parameters which form the basis for determining the standby rotation speed.

The rotation speed 26 caused by drag moment on an electromotive drive assembly is significantly less than the synchronization rotation speed 28, and also over wide ranges lower than the standby rotation speed 27. Also on steep flanks, i.e. rapid speed changes, because of the large mass of the rotor of the electric drive assembly and the weak coupling in the present powertrain, significant temporal shifts can occur between the rotation speed curve caused by the drag moment in relation to the vehicle speed curve.

Figure 3:
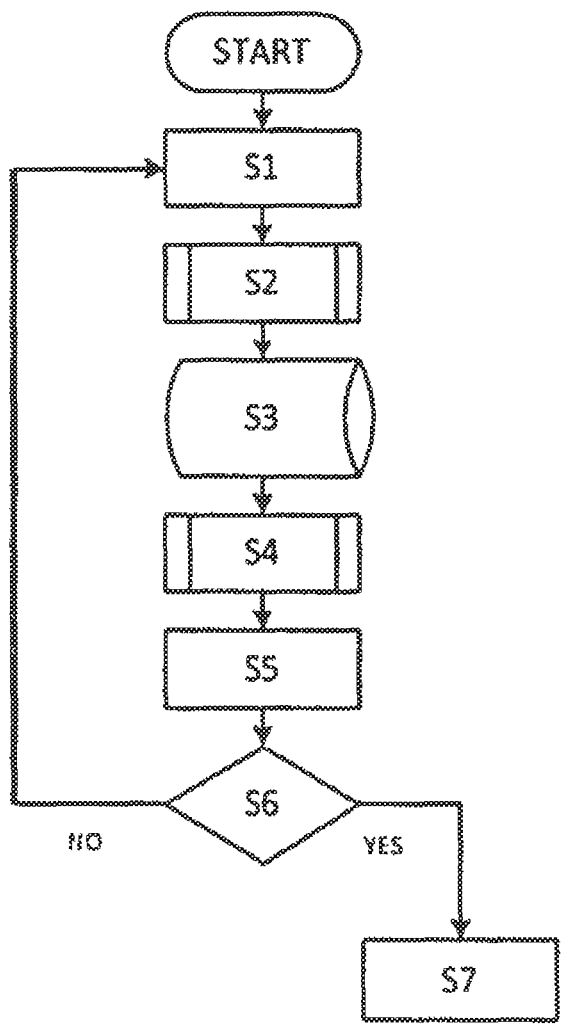
FIG. 3 illustrates diagrammatically the performance of a method for operating a powertrain in accordance with FIG. 1.

FIG. 3 illustrates as an example a flow diagram of the method in accordance with the invention for operating a powertrain. After the start, in a first step S1 the rotation speeds of wheels 16a, 16b, and where applicable further wheels 34a, 34b on second vehicle axle 32 of the motor vehicle, are measured and passed to the vehicle control unit 18. In a step S2, the latter determines the vehicle speed. With the determined value of the vehicle speed, in step S3 speed-dependent parameters of the powertrain may be obtained from a reference table stored in the vehicle control unit 18. In step S4, a standby rotation speed is determined from these parameters and further rules established by the vehicle manufacturer. In step S5, this standby rotation speed is transmitted to the electric drive control unit 17 and applied to the electromotive drive assembly 70. In step S6, the electric motor control unit 17 checks for the presence of a signal for engaging the clutch 10. Such a clutch engagement signal may for example be sent by the vehicle control unit 10. If no clutch engagement signal is present, the standby rotation speed of the electromotive drive assembly 20 is calculated in real time and updated on each run through loops S1 to S6.

If a clutch engagement signal is registered in step S6, the closure of the clutch 10 is initiated in step S7.

In order for the clutch 10 to be closed, the clutch parts 10a and 10b must be synchronized i.e. they must be brought to a substantially equal rotation speed level.

For this, the clutch part 10a, rotating more slowly than the clutch part 10b coupled to the third axleshaft portion 12c, is accelerated by the electromotive drive assembly 20 until the predefined rotation speed difference between the clutch parts 10a, 10b is reached or passed. Then the clutch actuator 11 may be activated to end the clutch engagement 10. The electromotive drive assembly 20 is switched from active speed regulation to active torque regulation.

In other words, first the rotation speed of the first clutch part 10a is synchronized with the rotation speed of the second clutch part 10b, in that the electromotive drive assembly 20 accelerates the first clutch part 10a. Completed synchronization means a state in which the two clutch parts have a predefined speed difference which is usually selected as comparatively small as possible, to allow smooth engagement of the clutch 10. The predefined rotation speed difference is dimensioned in particular such that the engagement process can be carried out without loss of driving comfort, and at the same time the actuation time is kept low.

On disengagement of the clutch 10, for example when a contribution of the electric motor is no longer required to propel the vehicle, the electromotive drive assembly 20 driving the planet wheel 14 is switched from torque regulation to rotation speed regulation, and the clutch 10 then ideally runs without load and can be opened by the clutch actuator 11.

LIST OF REFERENCE SIGNS

2 First vehicle axle
10 Clutch
10a, 10b Clutch parts
11 Clutch actuator
12a, 12b, 12c Axleshaft portions
13 Differential gear
14 Planet wheel
16a, 16b Wheels
17 Electric drive control unit
18 Vehicle control unit
20 Electromotive drive assembly
21 Control line, clutch actuator
22 Signal line
23 Communication line
26 Rotation speed caused by drag torque
27 Standby rotation speed
28 Synchronization rotation speed
32 Second vehicle axle
34a, 34b Wheels
36a, 36b Axleshaft portions
38 Differential gear
40 Second drive assembly
t Time
X Rotation speed
S1 Measurement of wheel rotation speeds
S2 Determination of vehicle speed
S3 Parameters from reference table
S4 Determine standby speed
S5 Apply standby speed
S6 Engagement signal
S7 Close clutch

What is claimed is:

1. A method for operating a powertrain of a motor vehicle with two vehicle axles which can be driven by separate drive assemblies, wherein at least one of the two vehicle axles can be driven by an electromotive drive assembly, and wherein the at least one vehicle axle has two wheels and at least three axleshaft portions, wherein a first axleshaft portion has a first wheel, wherein the first axleshaft portion and a second axleshaft portion are coupled by a differential gear, wherein the second axleshaft portion and a third axleshaft portion are arranged so they can be connected together by a clutch, and wherein the third axleshaft portion has a second wheel,
wherein during a drive mode of the motor vehicle with the clutch open, the electromotive drive assembly is held at a standby rotation speed under active regulation by an electric drive control unit, wherein the standby rotation speed tracks a synchronization rotation speed, and
wherein the standby rotation speed of the electromotive drive assembly is at least half as great as the synchronization rotation speed.

2. The method as claimed in claim 1, wherein a planet wheel of the differential gear is drivably connected to the electromotive drive assembly.

3. The method as claimed in claim 1, wherein the clutch has a first clutch part which is assigned to the second axle portion, and a second clutch part which is assigned to the third axle portion, wherein one of the two clutch parts can be actuated by a clutch actuator.

4. The method as claimed in claim 1, wherein the clutch is a claw clutch.

5. The method as claimed in claim 1, wherein the standby rotation speed of the electromotive drive assembly is established by the vehicle speed of the motor vehicle and the rotation speed of the wheels.

6. The method as claimed in claim 1, wherein parameters dependent on the vehicle speed are determined from a reference table characterizing the powertrain of the motor vehicle.

7. The method as claimed in claim 1, wherein the standby rotation speed of the electromotive drive assembly is determined from the current vehicle speed and the powertrain parameters dependent on the vehicle speed.

8. The method as claimed in claim 1, wherein the standby rotation speed of the electromotive drive assembly is determined by a predefined nominal value, dependent on the vehicle speed, for a time delay between a signal for engaging the clutch and the end of the clutch engagement process.

9. The method as claimed in claim 1, wherein the standby rotation speed of the electromotive drive assembly is calculated in real time and continuously updated.

10. The method as claimed in claim 1, wherein the at least three axleshaft portions are coaxially aligned with one another.

* * * * *